UNITED STATES PATENT OFFICE.

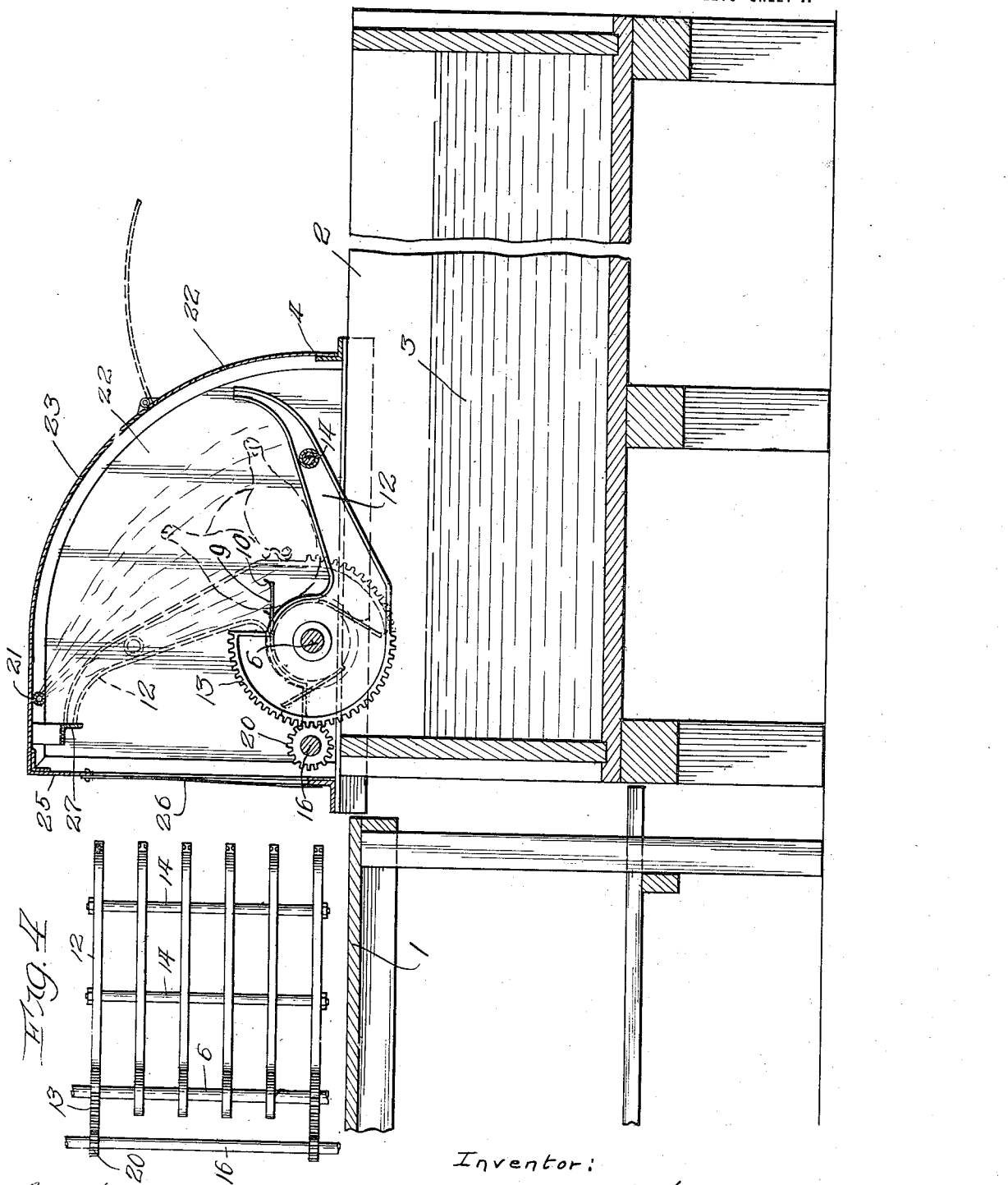

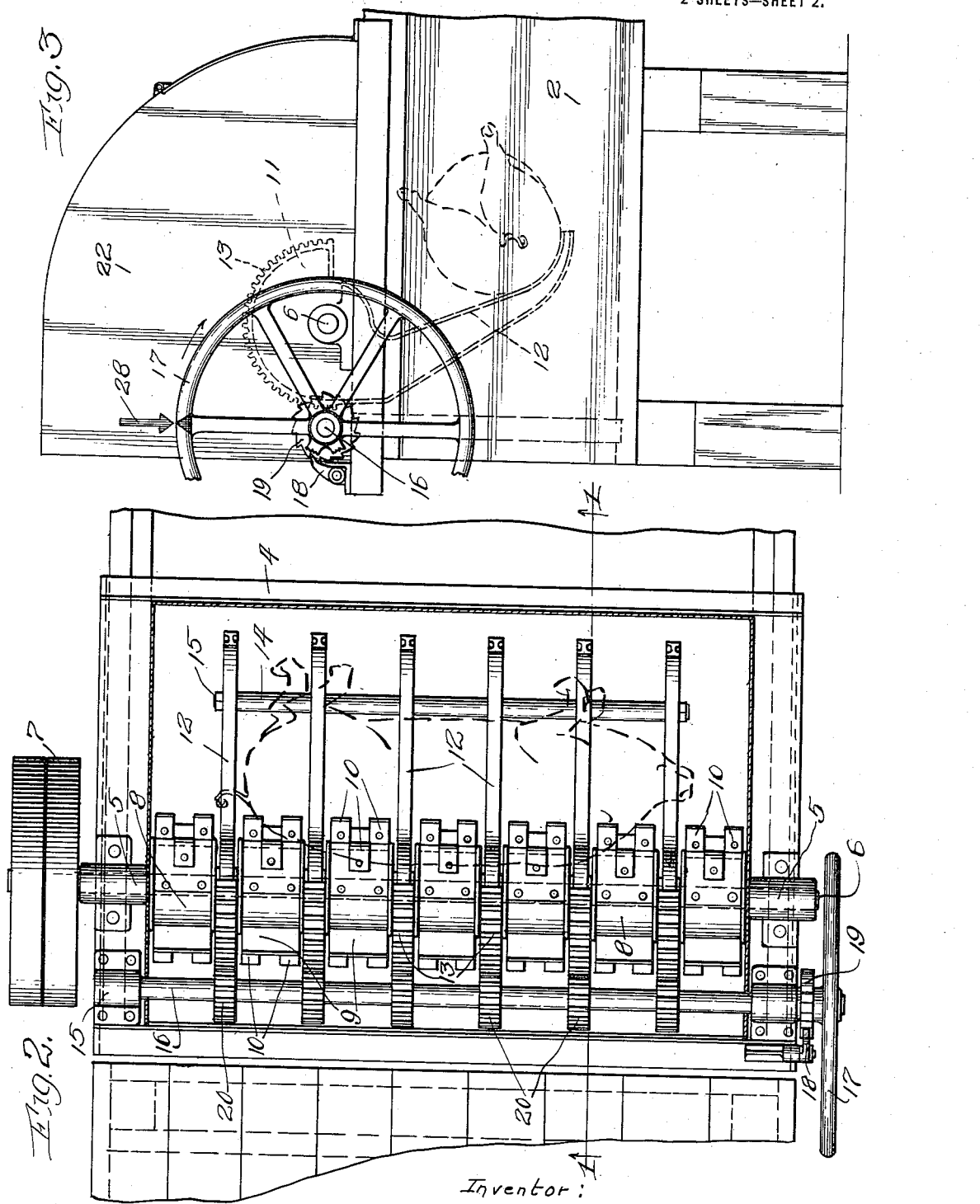

LOUIS A. KRAMER, OF CHICAGO, ILLINOIS.

CARCASS-DEHAIRING MACHINE.

1,415,580. Specification of Letters Patent. Patented May 9, 1922.

Application filed November 1, 1920. Serial No. 421,123.

*To all whom it may concern:*

Be it known that I, LOUIS A. KRAMER, a citizen of the United States, residing at Chicago, in the county of Cook and State of Illinois, have invented certain new and useful Improvements in a Carcass-Dehairing Machine; and I do hereby declare the following to be a full, clear, and exact description of the invention, such as will enable others skilled in the art to which it appertains to make and use the same.

My invention relates to machines for cleaning, dehairing and polishing carcasses, such as those of hogs, for which purpose my invention aims to provide a simple, compact, inexpensive, easily operated and highly effective machine suitable for the use of small packing establishments. In one of its general aspects, my invention aims to provide a machine of this class having a single carrier member which can easily be manipulated for picking up a carcass; for supporting the carcass in suitable relation to the dehairing, cleaning and polishing mechanism; and for therefore discharging the carcass from the machine. It also aims to provide simple means for manipulating such a carrier member, for latching the carrier member in one or more positions in which the carcass is subjected to the dehairing and cleaning operation, to provide simple means for preventing an excessive movement of the carrier member in its carcass-discharging direction, and to provide for automatically returning the carrier member to its initial position. Furthermore, my invention aims to provide a simple and effective construction for such a carrier member which will readily permit the carcass to slide and roll while being subjected to the dehairing and cleaning operation, but which will prevent the carcass from being excessively moved during such sliding or rolling. My invention also aims to provide simple means for imparting the desired movement to the carrier member, to arrange the latter so that the dehairing and cleaning mechanism can readily operate through the same, and to provide a simple mounting for the various parts of the mechanism.

More particularly, my invention aims to provide a carrier member for the above named purpose having a plurality of arms arranged for jointly supporting the carcass and transferring it successively to the dehairing position and to its discharge position; to provide a simple rotating mounting for such arms; to provide simple means for rigidly connecting and alining these arms, and to provide effective means for imparting the desired movement to the several arms. Furthermore, my invention aims to provide a carcass dehairing, cleaning and polishing machine adapted to be mounted upon one end of a scalding tank and arranged for cleaning the carcass while held over this tank and for thereafter discharging the carcass beyond the tank; to provide an effective housing for the mechanism and to arrange this so that it will not interfere with any step in the operation of the machine; and to provide simple means observable from the exterior of the housing for indicating the position of the carcass with respect to the operating mechanism.
Still further and more detailed objects will appear from the following specification and from the accompanying drawings, in which—

Fig. 1 is a vertical section through a machine embodying my invention and through adjacent portions of a scalding tank and a receiving table, taken from the correspondingly numbered line in Fig. 2.

Fig. 2 is a plan view of the same machine with the inclosing hood omitted and with dotted lines indicating a hog facing in the opposite direction from that of Fig. 1.

Fig. 3 is an elevation of a portion of the same equipment taken from the lower edge of Fig. 2, with dotted lines indicating the position of the carrier when picking a floating hog out of the scalding tank.

Fig. 4 is a plan view on a reduced scale, showing another construction of a carrier for the same general type of machine.

In the embodiment of the drawings, I am illustrating my machine as used in connection with a receiving table 1 adjacent to the end of a scalding tank 2 and containing a liquid 3 in which the hogs are scalded and floated towards the machine in the usual manner. Mounted upon the upper edge of the scalding tank is a horizontal metal frame 4 desirably constructed of angle steel bars, which frame carries bearings 5 for a main shaft 6 extending transversely of the scalding tank over the top of the latter. This shaft 6 is continuously rotated by power applied through a pulley 7 and has fastened to it a series of dehairing members spaced from each other along the shaft. Each of these dehairing members desirably consists of a drum 8 carrying a plurality of beater elements, and each of these beater elements comprises a flap 9 of rubber belting secured tangentially to the drum and carrying a number of metal scraper blades 10. The beater-carrying drums 8 are consecutively spaced from each other along the shaft by the hub portions 11 of a series of arms 12 which are all alined with each other transversely of the scalding tank and each of which arms is partly counter-weighted by a gear segment 13 integral with the arm. These arms are therefore spaced from each other at their hubs by the successive beater drums 8, and they are likewise spaced from each other at their hubs by the successive beater drums 8, and they are likewise spaced from each other at a distance from their hubs by tubes 14 having portions of a bolt 15 which connects the arms at the opposite ends of the resulting carrier arrangement.

The frame 4 also carries bearings 15 for a control shaft 16 which can be rotated by a hand wheel 17 and which is normally latched against retrograde movement by a pawl 18 engaging a ratchet wheel 19 fastened to the shaft 16. Fast upon this control shaft 16 are a series of pinions 20 which are respectively intermeshed with the gear segments 13 on the said arms. Owing to this gear and pinion arrangement, it will be seen from the drawings that a rotation of the control shaft 16 in a clockwise direction in Figs. 1 or 3 will simultaneously rotate all of the arms in a counterclockwise direction about the shaft 6, so that the arms can readily be moved from the pick-up position shown in dotted lines in Fig. 3 to the discharge position shown in dotted lines in Fig. 1. Each arm 12 desirably has its free end curved forwardly of the direction in which the arms are thus moved when passing from the pick-up position to the discharge position, so that the curved end portions cooperate in affording stops for initially retaining the hog on the arms when it is being lifted out of the scalding tank, and for limiting the extent to which the hog can move upon the arms away from the shaft 6 when the arms are holding the hog during the dehairing and cleaning operation.

This cleaning operation is desirably effected with the main portion of the forwardly directed surface of the arms extending obliquely upward from the axis 6 about which the arms are rotatable, and these forwardly directed surfaces are desirably in a common plane, so as to combine in providing flat faces upon which the hog may freely slide or roll. Moreover, these flat forward surfaces of the arms desirably extend obliquely from a point lower than the shaft 6, so that the hog will not be held so far above the shaft 6 during the dehairing operation as to make it possible for the dehairing beaters to toss the hog over the top of the gear portion 13 which partially counterweight the arms. With the dehairing mechanism rotating in a counterclockwise direction in Fig. 1, it will be obvious from the latter that each of the beater members will tend to roll and slide the hog up the slope of the arms, and owing to the irregular contour of the hog, the corresponding irregular movements imparted to the hog will slide and shift the latter transversely of the said arms, so as to bring practically all surface portions of the hog within the effective range of the beater members. To insure this effectiveness even with relatively large or long hogs, I desirably employ beater members exceeding the number of arms by one, after the manner of Fig. 2.

To rinse the detached hair and dirt off the hog, I desirably spray the latter continuously during the dehairing operation by hot water emitted from a spray pipe 21 mounted above the path of the arms 12. I also desirably inclose the mechanism by a metal casing having sides 22 carrying a hood 23 which may have a hinged flap portion 24 adapted to be raised as shown in dotted lines in Fig. 1 for affording access to the interior of the hood. On the side towards the receiving table, this casing has a ledge 25 extending downwardly from the top of the hood and carrying a flexible curtain 26 of waterproof material which curtain normally incloses that side of the casing but is readily pushed aside when the hog is being discharged from within the casing. To effect such a discharge, the control shaft 16 is turned sufficiently to bring the arms to the position shown in dotted lines in Fig. 1, thereby carrying the hog over the top of the dehairing members and forcing the hog to roll over the pinions 20 and out upon the receiving table 1. To limit the movement of the arms in this discharge direction, I desirably provide a suitable stop, such as an angle bar 27 extending across the interior of the casing within the path of the tips of the arms 12 and near the said ledge 25.

I also desirably provide suitable means outside of the casing for enabling the operator to note when the arms 12 have been moved to a position in which the hog is suitably disposed for an effective cleaning, as for example by painting an indicating arrow 28 on the side 22 which is directed towards the hand wheel 17 and by painting a corresponding indicating portion on the hand wheel 17, after the manner of Fig. 3. Furthermore, I desirably proportion the pinions 20 and the gear segments 13 so as to require exactly one entire revolution of the hand wheel 17 for moving the arms from the receiving position of Fig. 3 to the desirable operative position of Fig. 12, thereby enabling the pointer 28 to serve for indicating both of these positions the difference between the two being readily noted by the operator owing to the fact that the arms will swing back by gravity substantially to the position of Fig. 3 when the latch 18 has been manually released after discharging the previously cleaned hog from the machine.

In operation, the hogs are floated in the liquid of the scalding tank towards the end of the latter which supports the machine, and the operator after having discharged the previously cleaned carcass unlatches the pawl 18 so as to allow gravity to return the arms to the receiving position of Fig. 3. As soon as the hog has been floated against the arms, the operator turns the hand wheel 17 until the marking of the hand wheel comes into alinement with the indicator 28, thus showing that the hog has reached a desirable position for the dehairing operation. He then leaves the machine in this position with the beater shaft 6 continually rotating for such a length of time as is known to be required for the size and type of hog that is being cleaned. Or, if the hog picked up in this manner differs in size or apparent toughness of surface from the average for which the indicating part on the hand wheel 17 is adjusted, the operator can readily latch the arms 12 at a lower or higher position than that indicated in Fig. 1 by stopping the hand wheel 17 either short of the indicator 28 or somewhat beyond the latter.

When the necessary cleaning time has lapsed, the operator continues the rotation of the hand wheel 17 until the arms are positively halted by the stop member 27 as shown in dotted lines in Fig. 1, thereby discharging the hog over the top of the dehairing members. He then unlatches the pawl 18, so as to permit gravity to swing the arms back into their initial receiving position, after which the above described cycle of operations is repeated. It will therefore be evident that the entire operation of my machine is so exceedingly simple as to require no experience whatever on the part of the attendant. Moreover, by separately gearing each arm to the control shaft 16, I avoid undesirable torsional strains while moving all of the arms 12 as a unit. In practice the carcass-carrier of my machine is essentially an oscillating cradle in which the spaces between the arms and those outside of the two end arms afford openings through which the dehairing members can operate. Moreover, these dehairing members desirably rotate in the same direction in which the cradle or carrier member is moved when discharging the hog from the machine so that the engagement of the scraper elements 10 with the hog also aids in discharging the latter from the machine. So also, the dehairing members desirably operate upwardly through the spaces between the arms, so that they will tend to lift the carcass and hence will aid in shifting the latter upon the carrier.

However, while I have illustrated and described my machine in a highly desirable embodiment I do not wish to be limited to the details of the construction and arrangement above disclosed, it being obvious that the same might be modified in many ways without departing from the spirit of my invention or from the appended claims. For example, Fig. 4 shows an arrangement of the arms in which the bolt 15 and the spacer tubes 14 connect the extreme tips of the arms and in which the halting of the arms at the discharge position is effected by the engagement of the stop 29 with one of these tubes. So also, the gear segments on some of the arms might be omitted, as the desired movement could still be imparted to all the arms through pinions meshing with only a few of the arms, since the bolt 15 connects the latter. However, I desirably gear the control shaft to each arm both to distribute the strains and because the segmental gears partially counterweight the arms and hence make it easier to move the cradle which forms the carcass-carrier of my machine.

I claim as my invention:

1. In a carcass dehairing machine, a scalding tank, a revolving beater member overhanging the same, and means for lifting a carcass out of the scalding tank and carrying it through the beating path of the beater member over the beater member.

2. In a carcass dehairing machine, a scalding tank, a revolving beater member overhanging the same, a plurality of movable arms fast with respect to each other and arranged for lifting a carcass out of the scalding tank and for supporting it while carrying it past the beater member and over the beater member, and means for moving the arms to produce the said effect.

3. In a carcass dehairing machine, a scalding tank, a revolving beater member overhanging the same, a plurality of alined arms mounted for pivotal movement about an axis parallel to that of the beater member, the said arms being movable from an initial position in which they dip into the liquid in the scalding tank through the position in which they extend obliquely upward from the axis of the beater member and support the carcass during the dehairing thereof, to a discharge position in which the arms substantially overhang the beater member.

4. In a carcass dehairing machine, a rotating rehairing member, and carcass-carrying means mounted coaxially with the said member and arranged for successively lifting the carcass to a substantially fixed dehairing position and for thereafter discharging the carcass over the dehairing member.

5. In a carcass dehairing machine, a rotating dehairing member, and a carcass-carrier mounted substantially coaxial therewith and adapted to carry the carcass from a position lower than the said member to a position in which it bears by gravity against the latter.

6. In a carcass dehairing machine, a rotating dehairing member, and a carcass-carrier mounted substantially coaxial therewith and adapted to carry the carcass from a position lower than the said member to a position in which it bears by gravity against the latter and for thereafter carrying it over the top of the dehairing member.

7. In a carcass dehairing machine, a rotating dehairing member, and a carcass-carrier mounted substantially coaxial therewith and adapted to carry the carcass from a position lower than the said member through a series of positions in which it bears by gravity at various inclinations against the dehairing member.

8. In a carcass dehairing machine, a rotating dehairing member, and a carcass-carrier mounted substantially coaxial therewith and adapted to carry the carcass from a position lower than the said member to a position in which it bears by gravity against the latter and for thereafter carrying it over the top of the dehairing member, a casing housing the aforesaid member, and means operable from outside the carrier for moving the said carrier.

9. In a carcass dehairing machine, a rotatting dehairing member, and carcass-carrying means mounted coaxially with the said member and arranged for successively lifting the carcass to a dehairing position, supporting the carcass in the dehairing position, and thereafter discharging the carcass over the dehairing member.

10. In a carcass dehairing machine, a rotating dehairing member, and a carcass-carrier mounted substantially coaxial therewith and adapted to carry the carcass from a position lower than the said member to a position in which the carcass bears by gravity against the said member, a casing inclosing the said mechanism, means operable from outside the casing for moving the carrier, and means observable from outside the casing for indicating when the carrier has raised the carcass to the last named position.

11. In a carcass dehairing machine, a rotating dehairing member, a carcass-carrier adapted to carry the carcass from a position lower than the said member to positions in which it bears by gravity at various inclinations against the dehairing member, and means for latching the carrier in any one of the last named positions.

12. In a carcass dehairing machine, a rotating dehairing member, and a carcass-carrier mounted substantially coaxial therewith and adapted to carry the carcass from a position lower than the said member through a plurality of positions in which its surface portions are disposed in the path of the dehairing member.

13. In a carcass dehairing means, a rotatable dehairing member, a carcass-carrier rotatably mounted coaxial therewith, and separately controlled means for rotating the said member and the said carrier.

14. In a carcass dehairing means, a rotatable dehairing member, a carcass-carrier rotatably mounted coaxial therewith, means for continuously rotating the said member, means for imparting rotational movement to the carrier, and means for halting the carrier in a plurality of positions.

15. In a carcass dehairing machine, a continuously rotating dehairing member, single carrying means arranged for lifting a carcass from a position lower than the said member to a position contiguous to the said member but with its own axis above the axis of the said member and for thereafter discharging the carcass over the said member, and means for halting the carrying means when it has raised the carcass to the second named position.

16. In a carcass dehairing machine, a rotatable carrier for supporting the carcass, and a dehairing member substantially coaxial with the carrier and operating through openings in the latter.

17. In a carcass dehairing machine, a rotatable carrier for supporting the carcass, and a dehairing member substantially coaxial with the carrier and operating through openings in the latter upwardly upon the carcass.

18. In a carcass dehairing machine, spaced and alined arms mounted for simultaneous rotation about a common axis and arranged for lifting a carcass to dehairing position and for supporting it during the dehairing, and dehairing means operating through the spaces between the said arms when the latter are thus supporting the carcass.

19. In a carcass dehairing machine, spaced and alined arms mounted for simultaneous rotation about a common axis and arranged for lifting a carcass to dehairing position and for supporting it during the dehairing, and dehairing means operating upwardly through the spaces between the said arms when the latter are thus supporting the carcass.

20. In a carcass dehairing machine, spaced and alined arms mounted for simultaneous rotation about a common axis and arranged for lifting a carcass to dehairing position and for supporting it during the dehairing, and dehairing means operating through the spaces between the said arms and tending to roll the carcass upon the said arms away from the carcass when the arms are thus supporting the carcass.

21. In a hog dehairing machine, a dehairing mechanism, a pivoted carrier normally moved by gravity to a position in which it is adapted to pick up a carcass disposed lower than the dehairing mechanism, the carrier being movable to a position in which it carries the carcass over the dehairing mechanism, and means for halting the carrier in an intermediate position in which it supports the carcass in the path of the dehairing mechanism.

22. In a hog dehairing machine a dehairing mechanism, a carrier normally moved by gravity to a position in which it is adapted to pick up a carcass disposed lower than the dehairing mechanism, the carrier being movable to a discharge position in which it forces the carcass over the dehairing mechanism, and means for limiting such discharge movement of the carrier.

23. In a carcass dehairing machine, spaced and alined arms mounted for simultaneous rotation about a common axis and arranged for lifting a carcass to dehairing position and for supporting it during the dehairing, and single means geared independently to the several arms for moving the latter simultaneously about the said axis.

24. In a carcass dehairing machine, spaced and alined arms mounted for rotation about a common axis and jointly and entirely supporting a carcass in dehairing position while permitting the carcass to roll upon the arms away from the said axis, and dehairing means tending to effect such a rolling of the carcass.

25. In a carcass dehairing machine, spaced and alined arms mounted for rotation about a common axis and jointly and entirely supporting a carcass in dehairing position while permitting the carcass to slide and roll upon the arms so as to vary the distance between the carcass and the said axis, and dehairing means acting upon the carcass and tending both to slide and to roll the carcass away from the said axis.

26. In a carcass dehairing machine, a rotating shaft, a dehairing member comprising a plurality of portions fast upon and spaced along the shaft, carcass-supporting arms rotatable upon the shaft and respectively disposed between successive portions of the beater member and arranged for jointly and entirely supporting the carcass in dehairing position, and means for simultaneously controlling the positions of all of the said arms.

27. In a carcass dehairing machine, a rotating shaft, a dehairing member comprising a plurality of portions fast upon and spaced along the shaft, carcass-supporting arms rotatable upon the shaft and respectively disposed between successive portions of the beater member, a control shaft, and gearing operatively interposed between the control shaft and each of the said arms, the said arms being arranged for entirely supporting the carcass in dehairing position.

28. In a carcass dehairing machine, a rotating shaft, a dehairing member comprising a plurality of portions fast upon and spaced along the shaft, carcass-supporting arms rotatable upon the shaft and respectively disposed between successive portions of the beater member, a casing housing the aforesaid mechanism, means extending through the casing for simultaneously controlling the positions of all of the said arms, and means observable from outside the casing for indicating when the said arms are positioned for supporting the carcass for effective action of the dehairing mechanism.

29. In combination with a carcass scalding tank, a horizontal shaft disposed above the liquid in the said tank, rotatable dehairing means on the shaft, a movably mounted cradle adapted to lift a floating carcass out of the liquid in the tank and to carry the carcass over the means through a path in which the carcass contacts with the dehairing means, and means for holding the cradle in a position in which it supports the carcass above the liquid and in downwardly oblique contact with the dehairing means.

30. In a carcass dehairing machine, continuously rotating dehairing means having a horizontal axis, a pivoted cradle adapted to pick up a carcass and to carry the latter over the dehairing means, and means for holding the cradle in a position in which it supports the carcass in downwardly oblique engagement with the dehairing means.

31. In a carcass dehairing machine, dehairing means, a carcass manipulating member comprising a plurality of arms spaced along and pivoted upon a common axis, and means affording a rigid connection between the arms, the free ends of the arms all being curved in one direction and the edges of the arms facing the said direction being in alinement; the said manipulating member being arranged for lifting the carcass, supporting it in operative position with respect to the dehairing means and thereafter discharging it over the dehairing means.

32. In a carcass dehairing machine, a shaft, a plurality of arms rotatable thereon, means on the shaft for spacing the inner ends of the arms, means at a distance from the shaft for also spacing the arms, means for insuring simultaneous and equal rotation of the arms about the shaft when the arms are manipulating a carcass and means directed forwardly of the said rotating of the arms for retaining the carcass on the arms during the major portion of the said manipulating.

Signed at Chicago, October 28th, 1920.

LOUIS A. KRAMER.